US011110773B2

(12) United States Patent
Kawashima et al.

(10) Patent No.: US 11,110,773 B2
(45) Date of Patent: Sep. 7, 2021

(54) SEAT AIR-CONDITIONING DEVICE

(71) Applicant: DENSO CORPORATION, Kariya (JP)

(72) Inventors: Masafumi Kawashima, Kariya (JP);
Hironobu Murakami, Kariya (JP);
Takahisa Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 16/427,578

(22) Filed: May 31, 2019

(65) Prior Publication Data

US 2019/0283527 A1    Sep. 19, 2019

Related U.S. Application Data

(63) Continuation of application No. PCT/JP2017/038815, filed on Oct. 26, 2017.

(30) Foreign Application Priority Data

Dec. 8, 2016    (JP) .............................. JP2016-238714

(51) Int. Cl.
*B60H 1/00*    (2006.01)
*B60N 2/56*    (2006.01)
*A47C 7/74*    (2006.01)

(52) U.S. Cl.
CPC ........... *B60H 1/00285* (2013.01); *A47C 7/74* (2013.01); *B60N 2/56* (2013.01); *B60N 2/5628* (2013.01); *B60N 2/5642* (2013.01)

(58) Field of Classification Search
CPC ...... A47C 7/74; B60N 2/5942; B60N 2/5628;
B60N 2/56; B60N 2/5621; B60N 2/5635;
B60N 2/5642; B60N 2/565; B60N 2/5657; B60N 2/7041; B60H 1/00285
USPC .......................................................... 165/42
See application file for complete search history.

(56) References Cited

U.S. PATENT DOCUMENTS

| | | | | |
|---|---|---|---|---|
| 280,148 | A | * | 6/1883 | Douglas ................ B23B 27/083 407/64 |
| 1,922,228 | A | * | 8/1933 | Brown ..................... A47C 7/74 267/145 |
| 3,295,886 | A | * | 1/1967 | Goldmerstein .......... A47C 7/74 297/180.14 |
| 3,506,308 | A | * | 4/1970 | Fenton ................... A47C 7/742 297/452.47 |

(Continued)

FOREIGN PATENT DOCUMENTS

EP    0280148 A1 *  8/1988 .......... B60N 2/5825
JP    2005095343 A    4/2005
(Continued)

*Primary Examiner* — Jianying C Atkisson
*Assistant Examiner* — Jose O Class-Quinones
(74) *Attorney, Agent, or Firm* — Harness, Dickey & Pierce, P.L.C.

(57) ABSTRACT

A seat air-conditioning device provided in a compartment of a vehicle that supplies air generated by a blower includes a pad wrapped in the skin and a ventilation sheet which is formed in a thin plate shape and supplies air to the seated passenger. An internal space is formed in the pad. The pad includes a seating side communication part that communicates the internal space with the seating surface of the skin, and a blower side communication portion that communicates the internal space with the blower. The ventilation sheet is disposed in the internal space.

5 Claims, 6 Drawing Sheets

(56) References Cited

U.S. PATENT DOCUMENTS

| | | | | |
|---|---|---|---|---|
| 3,951,455 A * | 4/1976 | Bandel | ............... | A47C 7/20 |
| | | | | 297/452.6 |
| 3,961,823 A * | 6/1976 | Caudill, Jr. | ............ | B60N 2/5825 |
| | | | | 297/452.6 |
| 4,856,844 A * | 8/1989 | Isono | ............... | B60N 2/914 |
| | | | | 297/284.6 |
| 5,002,336 A * | 3/1991 | Feher | ............... | A47C 7/744 |
| | | | | 297/180.13 |
| 5,403,065 A * | 4/1995 | Callerio | ............... | A47C 7/74 |
| | | | | 297/180.11 |
| 5,597,200 A * | 1/1997 | Gregory | ............... | A47C 7/74 |
| | | | | 297/180.13 |
| 5,921,858 A * | 7/1999 | Kawai | ............... | B60N 2/6054 |
| | | | | 454/120 |
| 6,179,706 B1 * | 1/2001 | Yoshinori | ............ | B60N 2/5635 |
| | | | | 297/180.14 |
| 2002/0096915 A1 * | 7/2002 | Haupt | ............... | B60H 1/00285 |
| | | | | 297/180.13 |
| 2002/0135001 A1 * | 9/2002 | Gaucher | ............ | H01L 21/31691 |
| | | | | 257/295 |
| 2003/0230913 A1 * | 12/2003 | Buss | ............... | B60N 2/5685 |
| | | | | 297/180.14 |
| 2004/0090093 A1 * | 5/2004 | Kamiya | ............... | B60N 2/5657 |
| | | | | 297/180.14 |
| 2004/0139758 A1 | 7/2004 | Kamiya et al. | | |
| 2006/0038432 A1 * | 2/2006 | Koehler | ............... | B60N 2/5825 |
| | | | | 297/180.1 |
| 2006/0060344 A1 * | 3/2006 | Esaki | ............... | B60H 1/00285 |
| | | | | 165/287 |
| 2006/0138811 A1 * | 6/2006 | Pfahler | ............... | B60N 2/5635 |
| | | | | 297/180.14 |
| 2007/0040421 A1 * | 2/2007 | Zuzga | ............... | B60N 2/5657 |
| | | | | 297/180.13 |
| 2007/0063551 A1 * | 3/2007 | Gasic | ............... | B60N 2/5685 |
| | | | | 297/180.1 |
| 2007/0120401 A1 * | 5/2007 | Minuth | ............... | B60N 2/5621 |
| | | | | 297/180.14 |
| 2007/0193279 A1 * | 8/2007 | Yoneno | ............... | B60N 2/5692 |
| | | | | 62/3.3 |
| 2007/0200398 A1 * | 8/2007 | Wolas | ............... | B60N 2/5678 |
| | | | | 297/180.15 |
| 2008/0168787 A1 * | 7/2008 | Kameyama | ........ | B60H 1/00478 |
| | | | | 62/244 |
| 2009/0000031 A1 * | 1/2009 | Feher | ............... | A47C 7/748 |
| | | | | 5/423 |
| 2010/0060069 A1 * | 3/2010 | Hoshina | ............... | B60N 2/585 |
| | | | | 297/452.58 |
| 2011/0109127 A1 * | 5/2011 | Park | ............... | B60N 2/5657 |
| | | | | 297/180.1 |
| 2011/0109128 A1 * | 5/2011 | Axakov | ............... | A47C 21/044 |
| | | | | 297/180.1 |
| 2015/0008716 A1 * | 1/2015 | Dry | ............... | B60N 2/68 |
| | | | | 297/452.18 |
| 2016/0207431 A1 * | 7/2016 | Abe | ............... | B60N 2/5621 |
| 2017/0196362 A1 | 7/2017 | Miron | | |
| 2018/0064257 A1 | 3/2018 | Miron | | |
| 2019/0031063 A1 * | 1/2019 | Suzuki | ............... | B60N 2/5883 |

FOREIGN PATENT DOCUMENTS

| | | |
|---|---|---|
| JP | 2006056347 A | 3/2006 |
| JP | 2007-097948 A | 4/2007 |
| JP | 4013765 B2 | 11/2007 |
| JP | 4999455 B2 | 8/2012 |
| JP | 2016-132448 A | 7/2016 |
| WO | WO-2016027159 A2 | 2/2016 |

\* cited by examiner

SEAT AIR-CONDITIONING DEVICE

CROSS REFERENCE TO RELATED APPLICATIONS

The present application is a continuation application of International Patent Application No. PCT/JP2017/038815 filed on Oct. 26, 2017, which designated the United States and claims the benefits of priority of Japanese Patent Application No. 2016-238714 filed on Dec. 8, 2016. The entire disclosure of all of the above applications is incorporated herein by reference.

TECHNICAL FIELD

The present invention relates to a seat air-conditioning device having a ventilation sheet and having a function of supplying air to a seated passenger.

BACKGROUND

The seat air-conditioning device is used for a seat installed in a vehicle compartment and has a function of supplying air generated by a blower to a seated passenger sitting on the seat.

SUMMARY

A seat air-conditioning device of the present disclosure includes a ventilation sheet having a plurality of resin tubes, and which has a function of supplying air generated by a blower to a seated passenger, and which is capable of suppressing an increase in ventilation resistance.

According to one aspect of the present disclosure, a seat air-conditioning device provided in a passenger compartment of a vehicle supplies air generated by a blower to a seated passenger, and includes a pad formed in the skin and a ventilation sheet configured to supply air toward the seated passenger. The pad has an internal space, and a seating side communication portion for communicating the internal space with the seating surface of the skin and a blower side communication portion for communicating the internal space with the blower. The ventilation sheet is disposed in the internal space of the pad.

DETAILED DESCRIPTION

Hereinafter, embodiments will be described with reference to the drawings. In the following embodiments, the same or equivalent parts are denoted by the same reference numerals as each other, and explanations will be provided to the same reference numerals.

First Embodiment

The seat air-conditioning device 100 according to the first embodiment will be described with reference to FIG. 1 to FIG. 3.

Figure 1:
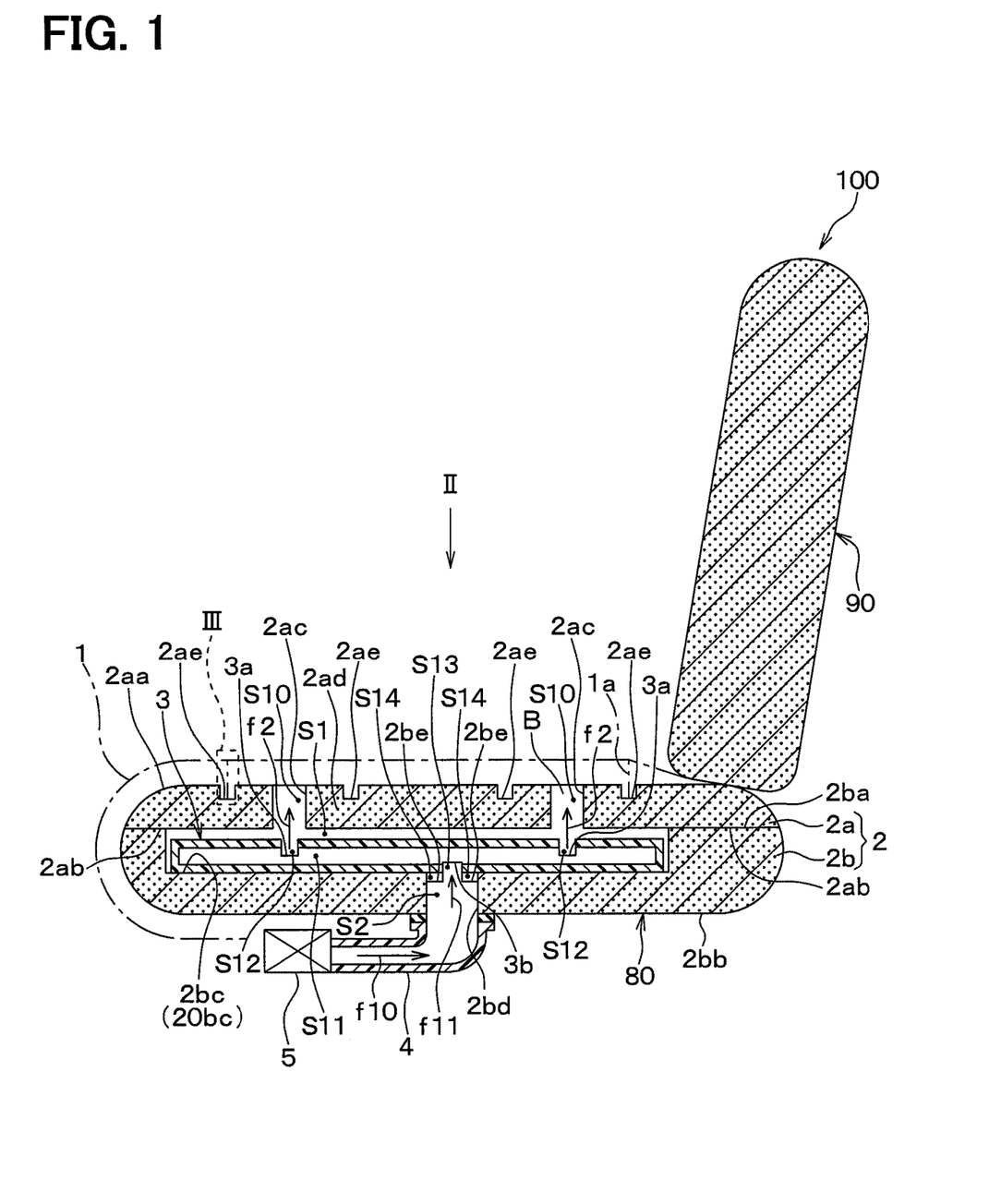
FIG. 1 is a diagram schematically showing an overall configuration of an air-conditioning device according to a first embodiment.

As shown in FIG. 1, the seat air-conditioning device 100 is installed in a passenger compartment of the vehicle, and functions as a seat, and of suppling conditioned air to a passenger seated on the seat air-conditioning device 100 (hereinafter referred to as a seated passenger). The seat air-conditioning device 100 has a seat portion 80, a backrest portion 90, and a pillow portion (not shown).

The seat portion 80 is a portion for supporting the buttocks, thighs and the like of the seated passenger. As shown in FIG. 1, the seat portion 80 includes a skin 1, a pad 2, a ventilation sheet 3, a duct 4, and a blower 5. The seat portion 80 is connected to the backrest portion 90. The seat air-conditioning device 100 has a function of supplying the air generated by the blower 5 to the seated passenger.

The skin 1 is a surface layer material that envelops the pad 2. The skin 1 is constituted by a perforated skin composed of natural leather or artificial leather. The skin 1 is formed with a plurality of fine holes (not shown) penetrating in the thickness direction of the skin 1. In the present embodiment, as indicated by an arrow f2 in FIG. 1, the air blown out from the seating side opening S10, which will be described later, formed in the ventilation sheet 3 is blown toward the seated passenger through the fine holes.

Figure 2:
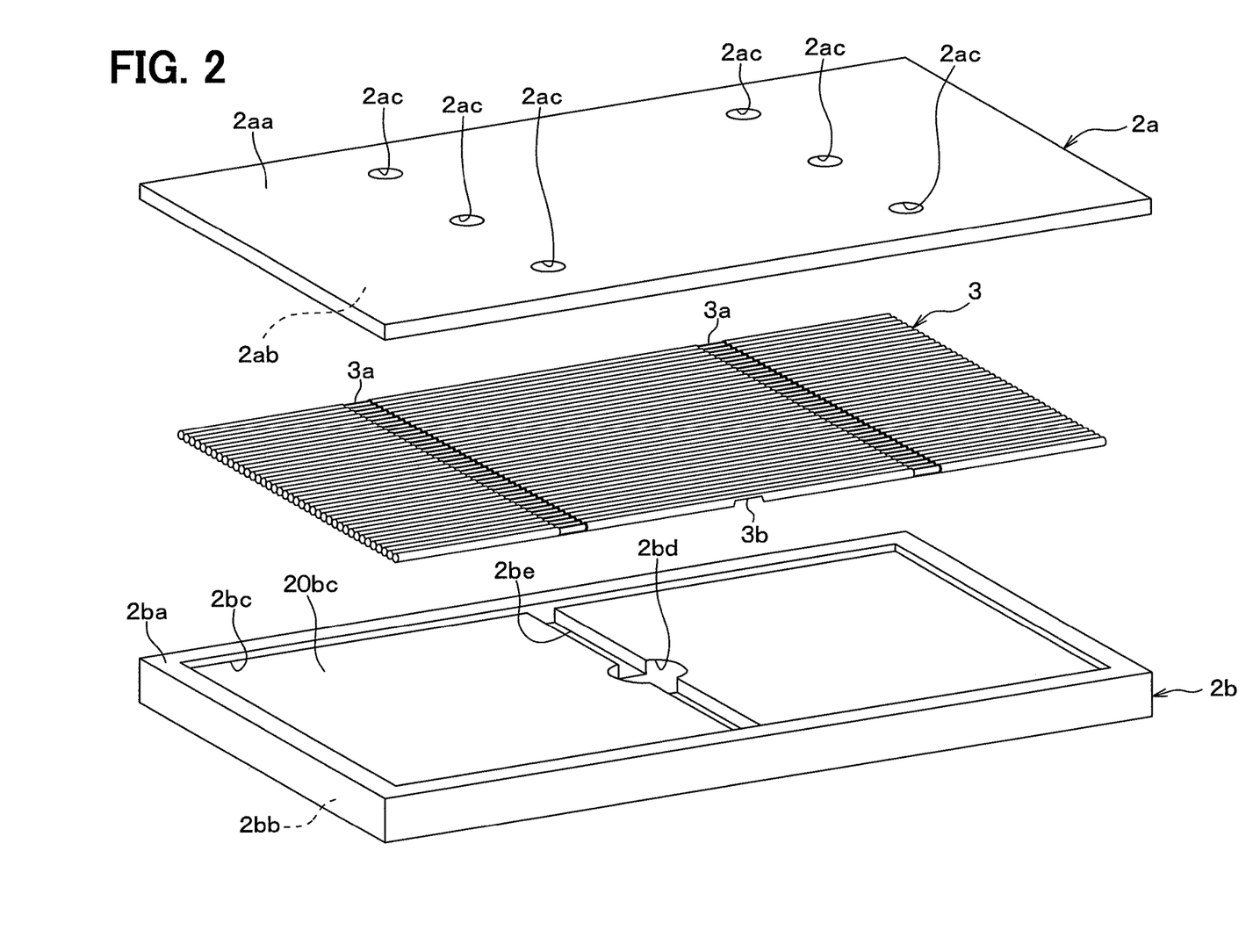
FIG. 2 is a perspective view showing the configuration of an upper side portion, a lower side portion, and a ventilation sheet, in a state in which the seat surface portion in the seat air-conditioning device shown in FIG. 1 is disassembled.

As shown in FIG. 2, the pad 2 is a member that forms a basic shape of the seat portion 80. The pad 2 has an upper side portion 2a located on the upper side in the vertical direction of the vehicle and a lower side portion 2b located on the lower side. Each of the upper side portion 2a and the lower side portion 2b is made of urethane foam having elasticity. The upper side portion 2a and the lower side portion 2b are combined with each other, and the pad 2 functions as a seat pad for a vehicle seat. The pad 2 is wrapped in the skin 1.

As shown in FIGS. 1 and 2, the upper side portion 2a has an upper surface 2aa on the side of the seated passenger and a surface 2ab connected to the lower side portion 2b on the side opposite to the upper surface 2aa. The upper side portion 2a is made of a material that is higher in rigidity than a tubular portion of the ventilation sheet 3 described later.

It is preferable that the upper side portion 2a is made of a highly rigid material so that the force applied to the tubular portion of the ventilation sheet 3 is reduced by the load of the seated passenger. In the seat air-conditioning device 100 according to the present embodiment, since the upper side portion 2a is made of the material having high rigidly, it is possible to suppress the tubular portion of the ventilation sheet 3 from being deformed due to the load of a seated passenger. However, if the rigidity of the upper side portion 2a is too high, the sitting comfort of the seated passenger may by being deteriorated. Therefore, it is particularly desirable that the upper side portion 2a is made of a material having a high rigidity enough to suppress deformation of the tubular portion of the ventilation sheet 3 and having a low rigidity enough to prevent the seating comfort of the seated passenger from being deteriorated.

Moreover, as shown in FIG. 1, the pad 2 has internal spaces S1 and S2. The internal spaces S1 and S2 include a first space S1 and a second space S2. Each of the first space S1 and the second space S2 is a space through which the air generated by the blower 5 passes.

As shown in FIGS. 1 and 2, the lower side portion 2b has a surface 2ba connected to the upper side portion 2a and a surface 2bb opposite to the surface 2ba. Moreover, a recess 2bc is formed on the surface 2ba. As shown in FIG. 1, the internal space of the recess 2bc is a part of the first space S1. The ventilation sheet 3 is disposed in a part of the first space S1. Specifically, as shown in FIG. 1, the ventilation sheet 3 is placed on the bottom portion 20bc of the recess 2bc.

As shown in FIG. 1, a part S10 formed in the upper side portion 2a of the first space S1 is a through hole opened in the upper surface 2aa of the upper side portion 2a on the seated passenger side. Hereinafter, this part S10 is referred to as a seating side opening. The seating side opening S10 is a space formed by being surrounded by the wall surface 2ac of the upper side portion 2a, and is communicated to the external space of the pad 2 on the side of the seated passenger in the upper side portion 2a. That is, the seating side opening S10 is communicated to the outside of the pad 2. Specifically, in the present embodiment, as shown in FIG. 2, there are six wall surfaces 2ac forming the seating side opening S10. Each of the six seating side openings S10 formed by the six wall surfaces 2ac penetrates the upper side portion 2a in the vertical direction of the vehicle. Therefore, the seating side opening S10 is a seating side communication portion that communicates the internal spaces S1, S2 with the seating surface (namely, surface on the side of the seated passenger) of the skin 1.

As shown in FIG. 1, the second space S2 is a through hole that opens at the lower surface 2bb opposite to the side of the seated passenger (i.e. the upper surface 2aa) of the lower side portion 2b. The second space S2 is communicated to the first space S1 and to the external space of the pad 2. Accordingly, the second space S2 is a blower side communication portion that communicates the internal spaces S1 and S2 with the blower 5.

As shown in FIG. 1, a part 2ad of the upper side portion 2a is interposed between the ventilation sheet 3 and the seated passenger. Hereinafter, this part 2ad is referred to as an intervening part. The intervening part 2ad is integrated with the other portion of the upper side portion 2a in a cross section different from that in FIG. 1. In the seat air-conditioning device 100 according to the present embodiment, the intervening part 2ad is interposed between the ventilation sheet 3 and the seated passenger, thereby exerting a function of reducing the load of the seated passenger applied to the ventilation sheet 3.

The upper side portion 2a and the lower side portion 2b are combined so that a sealed space (i.e. a space in which the ventilation sheet 3 is disposed in the first space S1) is formed in the pad 2, which is not communicated to the outside of the pad 2 except the six seating side openings S10.

As shown in FIG. 1, a plurality of hanging grooves 2ae for fixing the skin 1 are formed in the intervening part 2ad. The plurality of hanging grooves 2ae are formed on the upper surface 2aa of the upper side portion 2a. In FIG. 2, illustration of the hanging groove 2ae is omitted.

Figure 3:
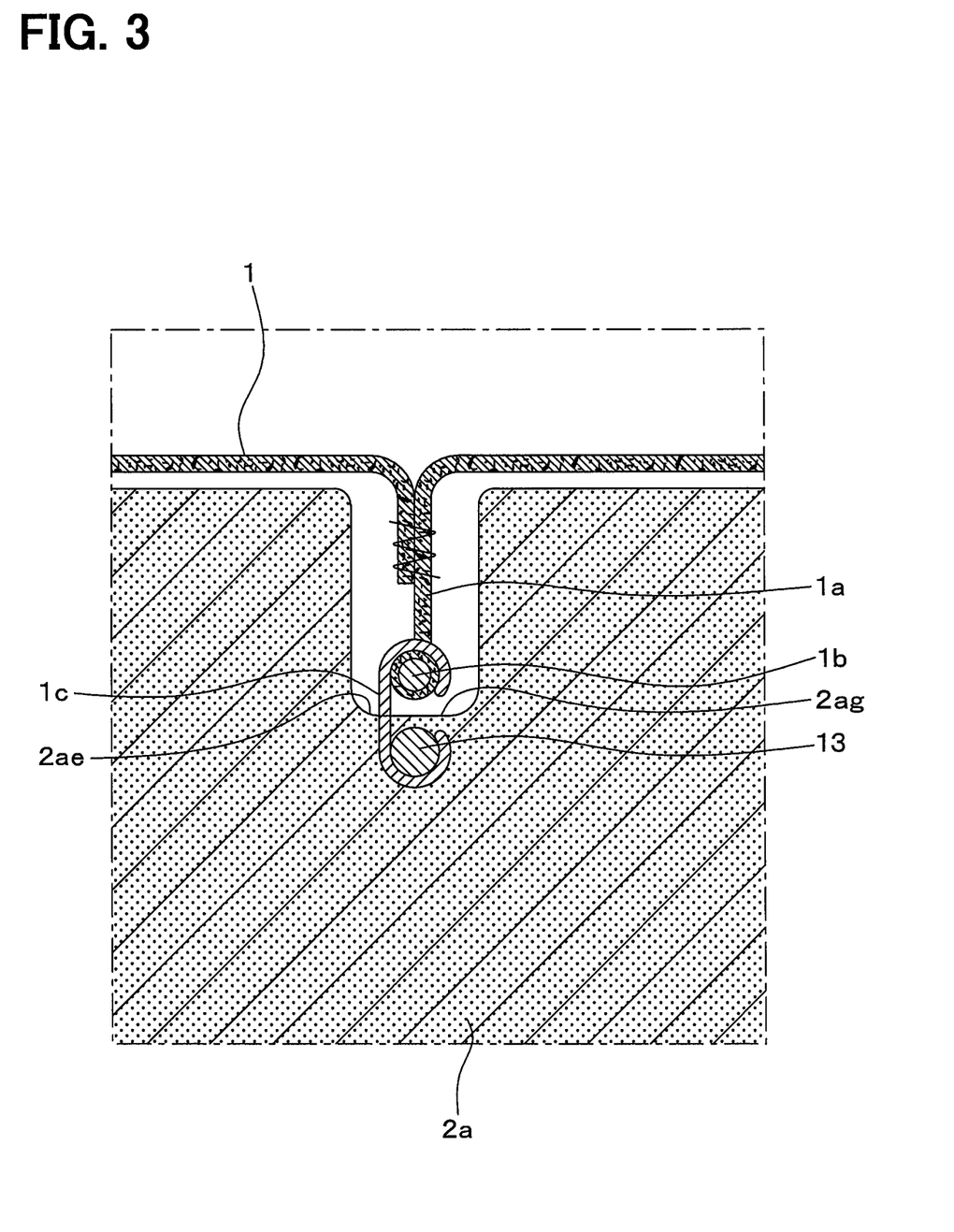
FIG. 3 is an enlarged view of a portion around a suspension groove in the seat air-conditioning device shown in FIG. 1.

As shown in FIG. 3, a hanging portion 1a provided on the back surface side of the skin 1 is hung in the hanging groove 2ae. The hanging wire 1b is held on the lower side of the hanging portion 1a. Moreover, the hanging wire 13 is embedded in the bottom part 2ag of the hanging groove 2ae. Then, the hanging wires 1b and 13 are caulked and fixed by a C-shaped ring 1c. The hanging portions 1a of the skin 1 are drawn into the hanging grooves 2ae of the upper side portion 2a, and the skin 1 is fixed while being brought into close contact with the upper surface 2aa of the upper side portion 2a.

As shown in FIG. 1, a groove portion 2be is formed in a wall surface (i.e. a bottom portion 20bc) of the lower side portion 20b, which surrounds the first space S1. Specifically, as shown in FIG. 2, the groove portion 2be is formed in the bottom portion 20bc of the recess 2bc of the lower side portion 2b. Further, the groove portion 2be is connected to the wall surface 2bd surrounding the second space S2.

As shown to FIG. 1 and FIG. 2, the ventilation sheet 3 is formed in a thin plate shape, and is a member which supplies air toward a seated passenger. The ventilation sheet 3 is a member having a configuration in which a plurality of tubular portions surrounding a sheet ventilation path S11, which will be described later, are arranged. Specifically, the ventilation sheet 3 in the present embodiment has 53 (fifty three) tubular portions. Each of the 53 (fifty three) tubular portions is formed of a resin tube having a ring shape in cross section. The cross-section referred to herein is a cross section of the inner wall surface of the tubular portion when the tubular portion is cut in a plane perpendicular to the axial direction of the tube in the tubular portion. The 53 (fifty three) tubular sections are connected to one another. In the ventilation sheet 3, a plurality of tubular portions may be integrally formed. The ventilation sheet 3 is disposed on the wall surface (i.e. the bottom portion 20bc) of the lower side portion 2b in the first space S1. The ventilation sheet 3 is arranged in parallel so that each of the 53 (fifty three) tubular portions extends in the longitudinal direction of the vehicle. In addition, as a material of the ventilation sheet 3, resin in general may be adopted. That is, the material of the ventilation sheet 3 may be a natural resin (i.e. natural rubber) or a synthetic resin (i.e. synthetic rubber).

As shown in FIG. 1, the sheet ventilation path S11, a first sheet opening S12, and a second sheet opening S13 are formed in the ventilation sheet 3.

The sheet ventilation path S11 is an internal space of each of the 53 (fifty three) tubular portions, and is a ventilation path through which the air generated by the blower 5 passes. That is, in the present embodiment, the 53 (fifty three) sheet ventilation paths S11 are formed. Each of the 53 (fifty three) sheet ventilation paths S11 extends in the longitudinal direction of the vehicle.

As shown in FIG. 1, the first sheet opening S12 is a space formed by providing a notch 3a on the upper side of each of the 53 (fifty three) tubular portions. The first sheet opening S12 is a ventilation path through which the air generated by the blower 5 passes, and is connected to each of the seating side opening S10 and the sheet ventilation path S11. In the present embodiment, two first sheet openings S12 are formed in each of the 53 (fifty three) tubular portions.

Each of the two notches 3a formed in each of the 53 (fifty three) tubular portions is formed such that a corresponding first sheet opening S12 of the adjacent tubular portions is connected to each other. In the present embodiment, since the notch 3a is formed in this manner, one space extending in the left-right direction of the vehicle is formed. As a result, in the present embodiment, two spaces extending in the left-right direction of the vehicle are formed.

As shown in FIG. 1, the second sheet opening S13 is a space formed by providing a notch 3b on the lower side of each of the 53 (fifty three) tubular portions. The second sheet opening S13 is a ventilation passage through which the air generated by the blower 5 passes, and is communicated to each of the sheet ventilation path S11 and the second space S2. In the present embodiment, one second sheet opening S13 is formed in each of the 53 (fifty three) tubular portions. The second sheet opening S13 is disposed at a position close to the second space S2 so as to pass air therethrough.

As shown in FIG. 1, in the seat air-conditioning device 100 according to the present embodiment, the ventilation sheet 3 is disposed such that the whole of the ventilation sheet 3 is accommodated in the first space S1. Moreover, since the skin 1 covers the pad 2, a portion of the skin 1 located above the ventilation sheet 3 is interposed between the ventilation sheet 3 and the seated passenger.

As shown in FIG. 1, the duct 4 is connected to the blower 5 and the surface 2bb of the pad 2. In other words, in the present embodiment, one end of the duct 4 is connected to the blower 5, and the other end thereof is connected to the surface 2bb of the pad 2. Specifically, the other end of the duct 4 is connected to the surface 2bb of the pad 2 so that the internal space of the duct 4 and the second space S2 are connected to each other. The duct 4 functions to send the air blown from the blower 5 to the second space S2 of the pad 2 through the internal space of the duct 4.

The blower 5 is an electric centrifugal blower that includes a rotating fan (not shown) and generates an air flow by the rotation of the fan. As the blower 5, for example, a centrifugal blower equipped with a centrifugal fan, an axial flow blower equipped with an axial flow fan, an axial flow blower equipped with a diagonal flow fan, or the like may be employed. As shown in FIG. 1, the blower 5 is fixed to the lower surface 2bb of the pad 2. The blower 5 is arranged on the lower side of seat air-conditioning device 100 such that the rotation axis of the fan substantially coincides with the vertical direction of the vehicle. Therefore, the blower 5 in the present embodiment blows the air along the extending direction of the lower surface 2bb of the pad 2 as indicated by the arrows f10 and f11 in FIG. 1. That is, the blower 5 corresponds to an air blowing portion for blowing air.

As described above, as shown in FIG. 1, the air generated by the blower 5 flows in the order of the internal space of the duct 4, the second space S2 inside the pad 2, and the first space S1, and is blown out toward a seated passenger located outside the pad 2 from the seating side opening S10. In essence, in the first space S1, the air flows in the order of the second sheet opening S13, the sheet ventilation path S11, and the first sheet opening S12, then flows to the seating side opening S10, and is blown toward the seated passenger. Since a part of the air flows through the space S14 surrounded by the groove 2be before flowing to the second sheet opening S13, it diffuses in the left-right direction of the vehicle, and flows into the corresponding second sheet opening S13, and then flows in the order of the sheet ventilation path S11 and the first sheet opening S12.

As described above, the air flows through the plurality of sheet ventilation paths S11 arranged in the left-right direction of the vehicle. Further, the plurality of arranged sheet ventilation paths S11 extend in the vehicle longitudinal direction. Therefore, in the present embodiment, it is possible to supply a wide range of air to the seated passenger in the left-right direction of the vehicle and in the longitudinal direction of the vehicle.

In the seat air-conditioning device 100 according to the present embodiment, the blower 5 may be configured to generate a flow of air drawn toward the blower 5. That is, in the seat air-conditioning device 100 according to the present embodiment, the air flow may be opposite to the air flow described above. This configuration is suitable, for example, when the internal spaces S1 and S2 of the seat air-conditioning device 100 are high temperature or high humidity and it is desirable to supply cool air to a seated passenger. When the air is blown toward the seated passenger as described above in the condition where the internal spaces S1 and S2 are high temperature or high humidity, high temperature or high humidity air is supplied to the seated passenger, so that the seated passenger feels uncomfortable. On the other hand, by supplying air to the seated passenger by the air flow in the opposite direction, it is possible to give the seated passenger a good refreshing feeling.

As described above, in the seat air-conditioning device 100 according to the present embodiment, the whole of the ventilation sheet 3 is accommodated in the first space S1. That is, the ventilation sheet does not protrude from the seat surface (i.e. the upper surface 2aa) of the pad 2, and is accommodated in the inner space (i.e. the first space S1) of the pad 2.

Therefore, in the seat air-conditioning device 100 according to the present embodiment, the load of the seated passenger is absorbed by the rigidity of the skin 1 and the pad 2 (i.e. the upper side portion 2a) positioned between the ventilation sheet 3 and the seated passenger. That is, the load when the seated passenger is seated is not directly applied to the ventilation sheet 3, but is absorbed by a portion of the skin 1 and the pad 2 that is interposed between the ventilation sheet 3 and the seated passenger. As compared to the seat air-conditioning device described in an assumable example (later described), which is a structure in which a load of the seated passenger is directly applied to the seat air-conditioning device, in the air-conditioning device 100 according to the present embodiment, the force applied to the ventilation sheet 3 by the load of the seated passenger is reduced. Therefore, in the seat air-conditioning device 100 according to the present embodiment, it is possible to suppress the deformation of the ventilation sheet 3 so as to be crushed, and to suppress the increase in the ventilation resistance by closing the ventilation path of the ventilation sheet 3. Moreover, the seat air-conditioning device 100 according to the present embodiment is different from the seat air-conditioning device in which the connection portion having the curved shape is used in accordance with the outer shape of the side surface (namely, surface which connects upper surface 2aa and lower surface 2bb) of the pad 2 as disclosed in the assumable example. Therefore, the seat air-conditioning device 100 according to the present embodiment also has the advantage that the above-mentioned problem in that the ventilation resistance is increased at the connection portion does not occur.

For example, instead of the configuration as in the present embodiment, it may be conceivable that the ventilation path member such as the ventilation sheet 3 is simply made of a material having a high rigidity are simply made of a material having high rigidity so that the ventilation path is not deformed. That is, for example, it is also conceivable to form the ventilation path member with a material having rigidity higher than the material constituting the pad 2 and the ventilation sheet 3 in the present embodiment. However, in this case, there is a problem that the seating comfort of the seated passenger is impaired due to the rigidity being too high. On the other hand, in the seat air-conditioning device 100 according to the present embodiment, it is advantageous to suppress deformation due to the load of the seated passenger as described above in the configuration using the pad 2 and the ventilation sheet 3 which are made of a material having relatively low rigidity.

Moreover, in the seat air-conditioning device 100 according to the present embodiment, the pad 2 has the intervening part 2ad interposed between the ventilation sheet 3 and the seated passenger. The intervening part 2ad reduces the load of the seated passenger to be applied to the ventilation sheet 3.

Therefore, in the seat air-conditioning device 100 according to the present embodiment, the load of the seated passenger is absorbed by the rigidity of the pad 2 (i.e. the intervening part 2ad or other part), so that the force applied to the ventilation sheet 3 is reduced. Therefore, in the seat air-conditioning device 100 according to the present embodiment, it is possible to suppress the deformation of the ventilation sheet 3, and to prevent the ventilation resistance from becoming large by closing the ventilation path of the ventilation sheet 3.

In all the vehicle seats including the seat air-conditioning device 100, the hanging groove 2ae is formed on the upper surface 2aa of the pad 2. The hanging groove 2ae is a groove for fixing the skin 1. In the case where the ventilation sheet 3 is disposed on the upper surface 2aa of the pad 2 as described in the assumable example, since the ventilation sheet 3 interferes with the arrangement of the hanging groove 2ae, the ventilation sheet cannot be arranged freely. That is, in this configuration, the hanging groove 2ae must be formed while avoiding the ventilation sheet 3 so as not to interfere with the ventilation sheet 3. On the other hand, in the seat air-conditioning device 100 according to the present embodiment, the ventilation sheet 3 does not interfere with the arrangement of the hanging groove 2ae, and the ventilation sheet 3 can be freely arranged.

In the seat air-conditioning device 100 according to the present embodiment, a plurality of hanging grooves 2ae for fixing the skin 1 are formed in the intervening portion 2ad.

As described above, in the seat air-conditioning device 100 according to the present embodiment, the ventilation sheet 3 does not interfere with the arrangement of the hanging groove 2ae by having the intervening part 2ad, and the ventilation sheet 3 can be arranged freely. Therefore, the seat air-conditioning device 100 which has the intervening part 2ad as in the present embodiment is suitable for the configuration in which the hanging groove 2ae is formed in the intervening part 2ad.

In the seat air-conditioning device 100 according to the present embodiment, the groove 2be connected to the wall surface 2bd which surrounds the second space S2 is formed on a wall surface (i.e. the bottom portion 20bc) of the pad 2, surrounds the first space S1.

Therefore, in the seat air-conditioning device 100 according to the present embodiment, the air passing through the second sheet opening S13 is easily diffused through the space S14 surrounded by the groove 2be, so that the air can flow in a wide range (i.e. in a wide range in the direction in which the bottom portion 20bc of the pad 2 extends).

Other Embodiments

The present disclosure is not limited to the above-described embodiments, and can be appropriately modified.

Figure 4:
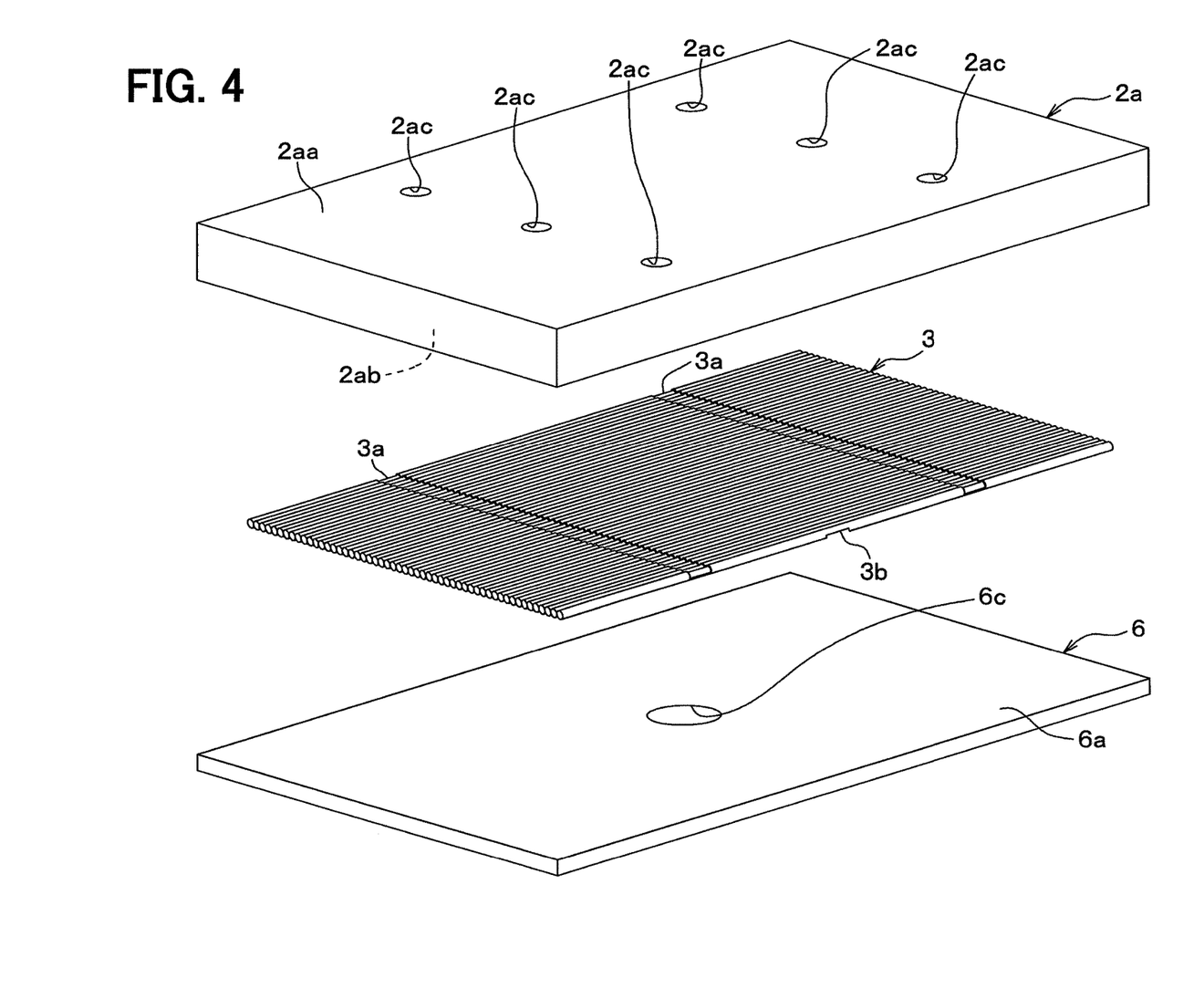
FIG. 4 is a perspective view showing the configuration of an upper side portion, a lower side portion, and a ventilation sheet, in a state in which the seat surface portion in the seat air-conditioning device according to other embodiment is disassembled.
Figure 5:
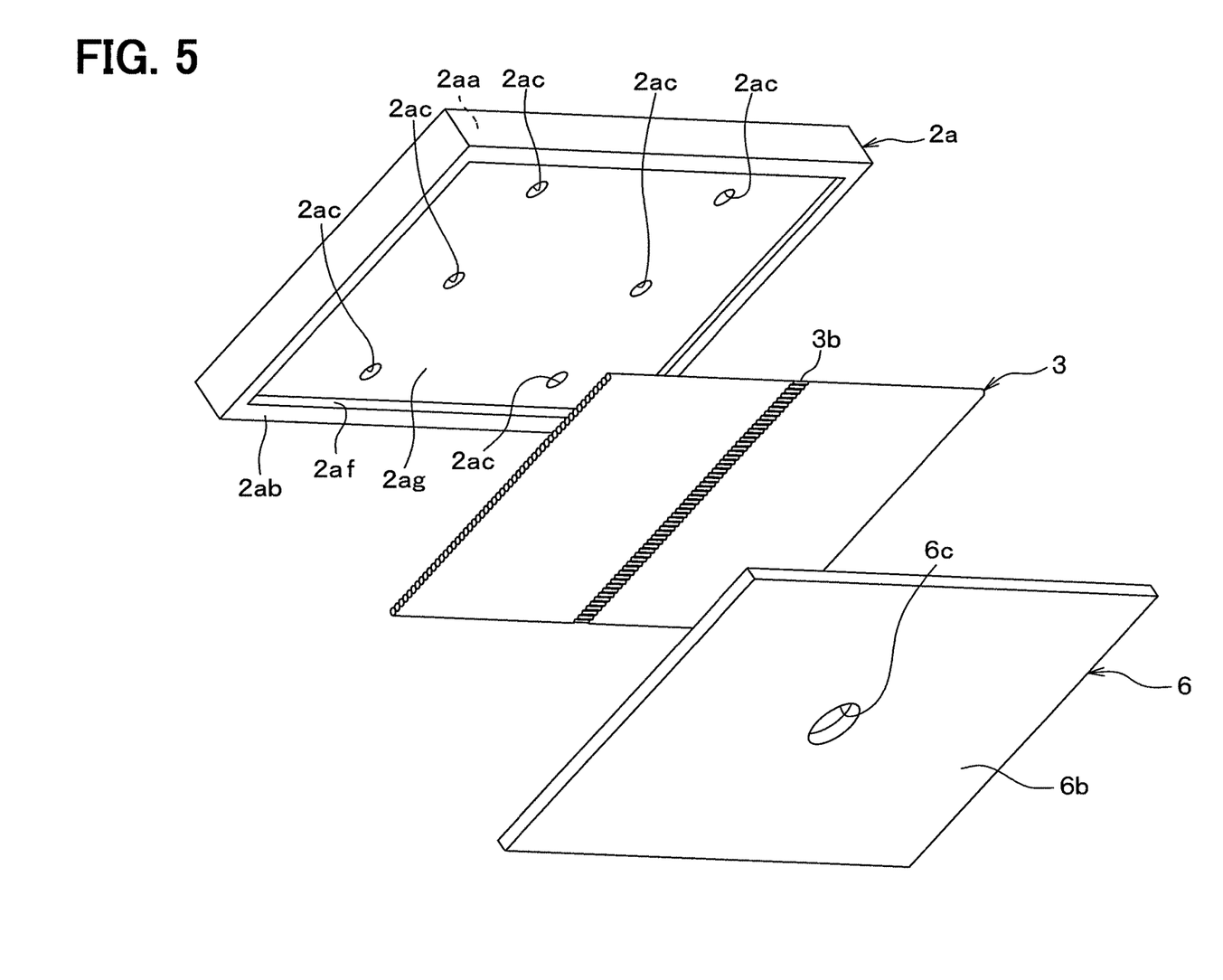
FIG. 5 is another perspective view showing the configuration of an upper side portion, a lower side portion, and a ventilation sheet, in a state in which the seat surface portion in the seat air-conditioning device according to other embodiment is disassembled.
Figure 6:
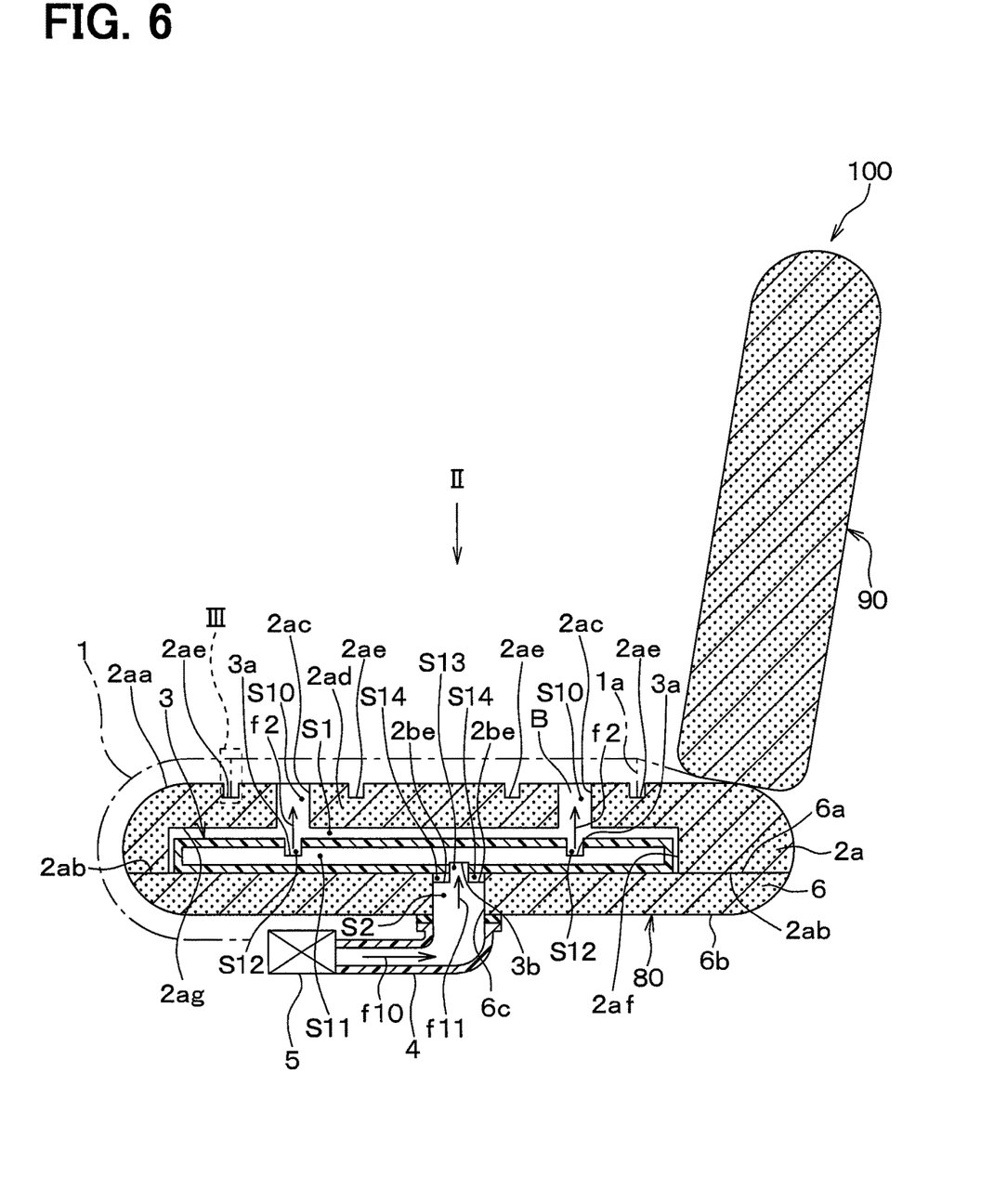
FIG. 6 is a diagram schematically showing an overall configuration of an air-conditioning device according to other embodiment.

For example, as long as the entire ventilation sheet 3 is accommodated in the first space S1, the shape and the like of the pad 2 are not limited to the configuration in the first embodiment. That is, for example, in the first embodiment, as shown in FIG. 4, FIG. 5, and FIG. 6, a recess 2af may be formed on the surface 2ab opposite to the upper surface 2aa of the upper side portion 2a. Then, the lower side portion 2b may be replaced by the flat plate 6, and the ventilation sheet 3 may be disposed in a space between the recess 2af and the flat plate 6. As shown in FIG. 4 and FIG. 6, the surface 6a of the flat plate 6 on the side of the upper side portion 2a is a flat surface. Further, in the flat plate 6, a wall surface 6c that surrounds the through hole as the second space S2 is formed. The through hole penetrates from the surface 6a on the side of the upper side portion 2a of the flat plate 6 to the surface 6b on the side opposite to the upper side portion 2a of the flat plate 6. Moreover, the through hole as the seating side opening S10 penetrates from the upper surface 2aa of the upper side portion 2a to the bottom portion 2ag of the recess 2af. The flat plate 6 is made of felt.

Further, the size of the through hole as the seating side opening S10 is not particularly limited. That is, the through hole may be larger in size than that of the first embodiment. For example, the size of the through hole may be similar to that of the ventilation sheet. In the above configuration, although the configuration has substantially no intervening part 2ad, also in this configuration, the force applied to the ventilation sheet 3 by the load of the seated passenger by at least the skin 1 interposed between the ventilation sheet 3 and the seated passenger.

Further, in the first embodiment, one or both of the backrest portion 90 and the pillow portion are configured to have the ventilation sheet 3 and the first space S1, which are similar to the seat portion 80, and the ventilation sheet 3 may be entirely accommodated in the first space S1. Further, instead of the seat portion 80, only one or both of the backrest portion 90 and the pillow portion are provided with the ventilation sheet 3 and the first space S1 as described above, and the ventilation sheet 3 may be entirely accommodated in the first space S1.

The blower 5 disclosed in the above embodiment is an extrusion type in which air is blown into the internal spaces S1 and S2 of the pad 2. As described above, as shown in FIG. 1, the air generated by the blower 5 flows in the order of the internal space of the duct 4, the second space S2 inside the pad 2, and the first space S1, and is blown out toward a seated passenger located outside the pad 2 from the seating side opening S10.

However, the blower 5 may be a suction type in which air is sucked from the internal spaces S1 and S2 of the pad 2 to blow out air to the outside of the pad. In this case, the air generated by the blower 5 flows in the opposite direction to the direction indicated by the arrow in FIG. 1. Specifically, the air is introduced into the first space S1 through the seating side opening S10 from the seated passenger positioned outside the pad 2, then passes through the second space S2 and the internal space of the duct 4, is sucked into the blower 5, and is then blown out to the outside of the pad 2 and the skin 1 by the blower 5.

According to a first aspect shown in part or all of the above embodiments, in the seat air-conditioning device, the ventilation sheet is accommodated in the first space. The first space is a part of the interior space of the pad.

According to a second aspect, in the seat air-conditioning device having the first aspect, the pad has an intervening part interposed between the ventilation sheet and the seated passenger. The intervening part reduces the load of the seated passenger to be applied to the ventilation sheet.

According to the second aspect, the rigidity of the pad (i.e. the intervening part or the other part) absorbs the load of the seated passenger and reduces the force applied to the ventilation sheet. Therefore, the deformation of the ventilation sheet can be particularly suppressed, and it is possible to prevent the ventilation resistance from becoming large due to the blockage of the ventilation path of the ventilation sheet.

According to a third aspect, in the seat air-conditioning device having the second aspect, a hanging groove for fixing the skin is formed in the intervening part.

According to the third aspect, since the intervening part is provided, the ventilation sheet does not interfere with the arrangement of the hanging groove, and the ventilation sheet can be freely arranged.

According to a fourth aspect, in the seat air-conditioning device having at least one of the first to third aspects, a groove portion connected to the wall surface surrounding the second space is formed in the wall surface surrounding the first space in the pad.

According to the fourth aspect, the air passing through the second sheet opening is easily diffused through the space surrounded by the groove, whereby a wide range of the air can be flowed.

The seat air-conditioning device described in an assumable example includes a skin, a pad, a blower, and a ventilation sheet. The skin is a surface layer material that envelops the pad. The ventilation sheet is a member for supplying the air generated by the blower to the seated passenger. The ventilation sheet is disposed between the skin and the pad. In addition, the blower is disposed below the pad. The ventilation sheet includes a ventilation sheet main body which is formed by integrating a plurality of resin tubes functioning as ventilation path in parallel to each other. The ventilation sheet further includes a connecting portion formed of a resin tube which functions as a ventilation path for connecting the ventilation path of the ventilation sheet main body to the blower. The ventilation seat body is disposed on a seat surface on the side where the seated passenger sits of the pad. Therefore, in this seat air-conditioning device, the ventilation sheet main body protrudes from the seat surface of the pad. In addition, the connection portion is disposed from the ventilation sheet main body to the blower disposed below the pad through a rear side surface of the pad along the outer shape of the pad. In the seat air-conditioning device described in the assumable example, the air generated by the blower is supplied to the seated passenger through the ventilation sheet. That is, in this seat air-conditioning device, the air is supplied to the seated passenger through the connection portion disposed on the side surface of the pad. Therefore, the connection portion is formed to have a curved shape corresponding to the outer shape of the side surface of the pad, and the ventilation path of the connection portion is also formed to have a curved shape.

As described above, in the seat air-conditioning device described in the assumable example, the ventilation sheet main body protrudes from the seat surface of the pad. Therefore, according to the study, when a load of the seated passenger is applied to the ventilating sheet main body in the seat air-conditioning device, the ventilating sheet main body is crushed and is easily deformed. Therefore, the ventilation path of the ventilation sheet main body is blocked by this deformation, and the ventilation resistance of the air may be increased. Further, according to the study, the ventilation sheet main body may be deformed so as to be crushed due to the tension of the skin disposed on the ventilation sheet main body, so that the ventilation path of the ventilation sheet main body may be blocked, and the ventilation resistance of the air may be increased.

As described above, the seat air-conditioning device described in the assumable example is configured such that air is passed through the connection portion having a curved shape in accordance with the outer shape of the side surface of the pad. Therefore, according to the study, in the seat air-conditioning device, the connection portion of the ventilation sheet may deform so as to be crushed by the tension of the skin. Also, the ventilation path of the connection portion is blocked, and the ventilation resistance of the air passing through the ventilation path of the connection portion is increased. Further, according to the inventor's study, the ventilation resistance of the air passing through the ventilation path of the connection portion is also increased by the curved shape of the ventilation path of the connection portion.

The present disclosure provides a seat air-conditioning device which includes a ventilation sheet having a plurality of resin tubes, and which has a function of supplying air generated by a blower to a seated passenger, and which is capable of suppressing an increase in ventilation resistance.

According to one aspect of the present disclosure, a seat air-conditioning device provided in a passenger compartment of a vehicle supplies air generated by a blower to a seated passenger, and includes a pad formed in the skin and a ventilation sheet configured to supply air toward the seated passenger. The pad has an internal space, and a seating side communication portion for communicating the internal space with the seating surface of the skin and a blower side communication portion for communicating the internal space with the blower. The ventilation sheet is disposed in the internal space of the pad.

According to one aspect of the present disclosure, a seat air-conditioning device provided in a passenger compartment of a vehicle supplies air generated by a blower to a seated passenger, and includes a pad formed in the skin and a ventilation sheet configured to supply air toward the seated passenger. The pad has an internal space, and the internal space includes a first space and a second space through which air is passed. The first space includes a seating side opening which is connected to the outer space of the pad on the side of the seated passenger. The second space connects to the first space and is connected to the external space of the pad. The ventilation sheet includes a sheet ventilation path through which the air flows, a first sheet opening communicated to each of the seating side opening and the seat ventilation path so as to pass the air to them, and a second sheet opening communicated to each of sheet ventilation path and the second space so as to pass the air to them. In addition, the ventilation sheet is disposed in the first space.

According to the seat air-conditioning device, the load of the seated passenger is absorbed by the rigidity of the skin and the pad positioned between the ventilation sheet and the seated passenger. That is, the load when the seated passenger is seated is not directly applied to the ventilation sheet, but is absorbed by a portion of the skin and the pad that is interposed between the ventilation sheet and the seated passenger. As compared to the seat air-conditioning device described in the assumable example, which is a structure in which a load of the seated passenger is directly applied to the seat air-conditioning device, the force applied to the ventilation sheet by the load of the seated passenger is reduced. Therefore, in this seat air-conditioning device, it is possible to suppress the deformation of the ventilation sheet so as to be crushed, and to suppress the increase in the ventilation resistance by closing the ventilation path of the ventilation sheet.

The invention claimed is:

1. A seat air-conditioning device provided in a compartment of a vehicle which supplies air generated by a blower to a seated passenger, comprising:
   a pad wrapped in a skin, and
   a ventilation sheet which is formed in a plate shape and supplies air to the seated passenger, wherein
   the pad has an internal space,
   the ventilation sheet is disposed in the internal space,
   the internal space includes a first space and a second space through which the air passes,
   the first space includes a seating side opening communicated to an external space of the pad on the side of the seated passenger,
   the second space is communicated to the first space and to the blower in the external space of the pad,
   a groove connected to a wall surface surrounding the second space is formed in a wall surrounding the first space in the pad,
   the ventilation sheet has a plurality of straight tubes that are arranged side by side in a predetermined direction,
   each of the plurality of straight tubes extends along a direction intersecting the predetermined direction,
   the ventilation sheet has a seat ventilation passage which is an internal space of each of the plurality of straight tubes, a first seat opening formed in each of the plurality of straight tubes and connected to each of the seating side opening and the seat ventilation passage, and a second seat opening formed in each of the plurality of straight tubes and connected to each of the seat ventilation passage and the second space,
   the groove extends in the predetermined direction, and
   the air diffuses in the predetermined direction by flowing through a space surrounded by the groove so as to flow into the corresponding second seat opening.

2. The seat air-conditioning device according to claim 1, wherein
   the pad has a rigidity higher than that of the ventilation sheet.

3. The seat air-conditioning device according to claim 1, wherein
   the plurality of straight tubes extend end to end along an entire length of the ventilation sheet.

4. The seat air-conditioning device according to claim 1, wherein
   each of the plurality of straight tubes includes upper grooves and lower grooves formed therein.

5. The seat air-conditioning device according to claim 1, wherein
   the plurality of straight tubes are aligned with and connected to each other to form the ventilation sheet.

* * * * *